(12) United States Patent
Patient

(10) Patent No.: US 7,775,504 B2
(45) Date of Patent: Aug. 17, 2010

(54) FLUID FLOW CONTROL DEVICE

(75) Inventor: Christopher Simon Patient, Sutton Coldfield (GB)

(73) Assignee: Norgren Limited, Staffordshire (GB)

( * ) Notice: Subject to any disclaimer, the term of this patent is extended or adjusted under 35 U.S.C. 154(b) by 16 days.

(21) Appl. No.: 11/569,436

(22) PCT Filed: May 18, 2005

(86) PCT No.: PCT/GB2005/001879

§ 371 (c)(1),
(2), (4) Date: Sep. 26, 2007

(87) PCT Pub. No.: WO2005/116498

PCT Pub. Date: Dec. 8, 2005

(65) Prior Publication Data

US 2008/0053540 A1      Mar. 6, 2008

(30) Foreign Application Priority Data

May 27, 2004     (GB) .................................. 0411817.0

(51) Int. Cl.
*F16K 31/02* (2006.01)
(52) U.S. Cl. ................... 251/129.04; 137/494; 137/499
(58) Field of Classification Search ............ 251/129.04; 137/624.11–624.14, 455, 494, 497, 499
See application file for complete search history.

(56) References Cited

U.S. PATENT DOCUMENTS

| | | | | | |
|---|---|---|---|---|---|
| 2,436,683 A | * | 2/1948 | Wood, Jr. ..................... | 290/52 |
| 4,246,753 A | * | 1/1981 | Redmond ..................... | 60/398 |
| 4,272,686 A | * | 6/1981 | Suzuki ......................... | 290/54 |
| 4,276,482 A | * | 6/1981 | Crockett ...................... | 290/52 |
| 4,320,782 A | * | 3/1982 | Pauliukonis ............. | 137/625.65 |
| 4,392,063 A | * | 7/1983 | Lindquist .................... | 290/54 |
| 4,731,545 A | * | 3/1988 | Lerner et al. ................ | 290/54 |
| 4,838,310 A | | 6/1989 | Scott et al. | |
| 4,942,736 A | * | 7/1990 | Bronicki ................. | 60/641.12 |
| 4,951,915 A | | 8/1990 | Piao | |
| 4,963,780 A | * | 10/1990 | Hochstrasser ............... | 310/104 |
| 5,278,749 A | * | 1/1994 | De Man ....................... | 700/14 |
| 5,349,985 A | | 9/1994 | Fischer | |
| 5,427,350 A | * | 6/1995 | Rinkewich ............... | 251/30.01 |

(Continued)

FOREIGN PATENT DOCUMENTS

DE          3147509 C1 *   3/1983

(Continued)

*Primary Examiner*—John K Fristoe, Jr.
*Assistant Examiner*—Marina Tietjen
(74) *Attorney, Agent, or Firm*—The Ollila Law Group LLC

(57) ABSTRACT

A fluid flow control device (1) comprising at least one valve, the or each valve being controlled by an electrically-operate e actuator (32), a control means (27) for controlling the actuators and a communication means (28) to provide signals for the control means (27), wherein the device (1) includes an electrical power generation means (5) to generate electricity from the flow of fluid in the control device to operate the actuators (32), the control means (27) and the communication means (28). The device does not require an external electricity supply as it generates its entire electricity requirement locally. The device (1) may also receive instructions wirelessly to control the at least one valve.

26 Claims, 2 Drawing Sheets

U.S. PATENT DOCUMENTS

| | | | |
|---|---|---|---|
| 6,011,334 A * | 1/2000 | Roland | 310/86 |
| 6,581,619 B1 * | 6/2003 | Christiani et al. | 137/14 |
| 6,837,271 B1 | 1/2005 | Saint | |
| 7,233,078 B2 * | 6/2007 | Baarman et al. | 290/43 |
| 7,253,536 B2 * | 8/2007 | Fujimoto et al. | 290/43 |
| 7,264,177 B2 * | 9/2007 | Buck et al. | 239/63 |
| 2003/0041370 A1 * | 3/2003 | Chung | 4/300 |
| 2004/0066302 A1 | 4/2004 | Menard et al. | |
| 2005/0061336 A1 * | 3/2005 | Goetz et al. | 128/899 |

FOREIGN PATENT DOCUMENTS

| | | |
|---|---|---|
| EP | 0400688 A2 | 12/1990 |
| FR | 2582475 A1 * | 12/1986 |
| WO | WO90/15278 | 12/1990 |

\* cited by examiner

FLUID FLOW CONTROL DEVICE

FIELD OF INVENTION

This invention relates to a fluid flow control device and more particularly to valve islands comprising valves for controlling fluid-powered devices such as, for example, actuating cylinders. The invention is applicable to pneumatic and hydraulic control valves but, for convenience, this specification refers largely to the former.

BACKGROUND OF INVENTION

It is now commonplace in, for example, production machinery for all of the actuating cylinders to be controlled by respective directional control valves that are usually mounted on one and the same 'valve island'. The valves in the valve islands are usually controlled by solenoids that receive electrical signals to actuate the associated valve. The valve islands are thus connected to a pneumatic line that supplies pressurized gas, an electrical line to provide power for the solenoids and an electrical communication line to control the operation of the valve island. Such valve islands have the advantage of compactness but each one requires the connection of electrical, communication and pneumatic lines. Therefore, production machinery having several valve islands will require a relatively complex network of supply lines for their operation, which can be difficult to install and expensive for the end-user.

More recently valve islands have been constructed to make use of wireless communication technology to control the operation of the solenoids on the valve island. Thus, these valve islands do not require a communication line. However, these valve islands still require a network of pneumatic and electrical power lines and thus the support network for a plurality of valve islands is still complex.

SUMMARY OF INVENTION

According to the present invention, we provide a fluid flow control device comprising at least one valve, the or each valve being controlled by an electrically-operable actuator, a control means for controlling the actuators and a communication means to provide signals for the control means, wherein the device includes an electrical power generation means to generate electricity from the flow of fluid in the control device to operate the actuators, the control means and the communication means.

This device does not require an external electricity supply as it generates its entire electricity requirement locally. This is particularly advantageous if the device controls the flow of water, for example, as it does not require an external electricity supply, which may be hazardous in the vicinity of water. Preferably, the device receives fluid from a fluid flow supply line.

Preferably the communication means operates wirelessly. Therefore the only external supply line that the control device requires to operate is the fluid flow line. The fluid flow supply line may be a pneumatic line supplying pressurized gas or a hydraulic line supplying hydraulic fluid. This makes the control device easy to install, as only a single supply line is required. This arrangement is particularly advantageous as the complexity of the support supply network is significantly reduced.

The communication means may operate wirelessly using a radio frequency standard such as industrial Bluetooth standard or ZigBee. However the communication means may operate using Wi-Fi, infrared, optical or ultrasonic standards.

Preferably, the electrical power generation means uses the fluid flow from the fluid flow supply line to generate electricity.

Alternatively, the electrical power generation means uses the fluid flow from the exhaust of the or each valve to generate electricity. Thus, the control device uses fluid that would not normally be utilised and, in the case of a pneumatic system, exhausted to atmosphere. For a hydraulic system, the exhaust fluid would not normally be utilised and simply return to a hydraulic reservoir. This improves the efficiency of the control device.

Where the electrical power generation means generates electricity from the fluid flow from the exhaust of the valve or valves, the control device may include an initial power source that provides the power to operate the actuators, the control means and the communication means until the flow of fluid from the exhaust of the valve or valves is sufficient to cause the power generation means to generate electricity. The initial power source may be a pre-charged battery. Alternatively, it could be a vessel of compressed fluid that is adapted to be exhausted through the power generation means to generate electricity initially. The initial power source may be rechargeable.

Preferably, the device includes a selection valve that has two inputs and one output to the power generation means, the first input receives fluid flow from the fluid flow supply line and the second input receives fluid from the exhaust of the or each valve, the selection valve being adapted to select which of the inputs is in communication with the power generation means.

Preferably, the selection valve is actuated by a solenoid. Thus, the selection valve can be controlled electronically to select which fluid flow is used to generate electricity in the device. Preferably, the selection valve is biased so that by default the fluid flow supply line is in communication with the power generation means.

Preferably, the solenoid of the selection valve is supplied with power from the power generation means. Thus, once the solenoid is supplied with the required power, it actuates the selection valve that switches so that the exhaust fluid flow is directed to the power generation means. This is advantageous as the selection valve does not require sophisticated control means, and the device utilises the exhaust fluid flow as soon as the flow from the fluid flow supply line has generated sufficient power to operate the actuators, control means, the communication means and the selection valve solenoid.

Preferably, the power generation means comprises a turbine that is connected to an electrical generator.

Preferably, the power generation means is connected to an accumulator such that the accumulator stores the electrical power generated by the power generation means. The accumulator may be a capacitor or a rechargeable battery.

A rectifier may rectify the electrical output from the power generation means before it enters the accumulator.

DESCRIPTION OF THE DRAWINGS

There now follows by way of example only a detailed description of the present invention with reference to the accompanying drawings, in which.

DETAILED DESCRIPTION OF THE INVENTION

Figure 1:
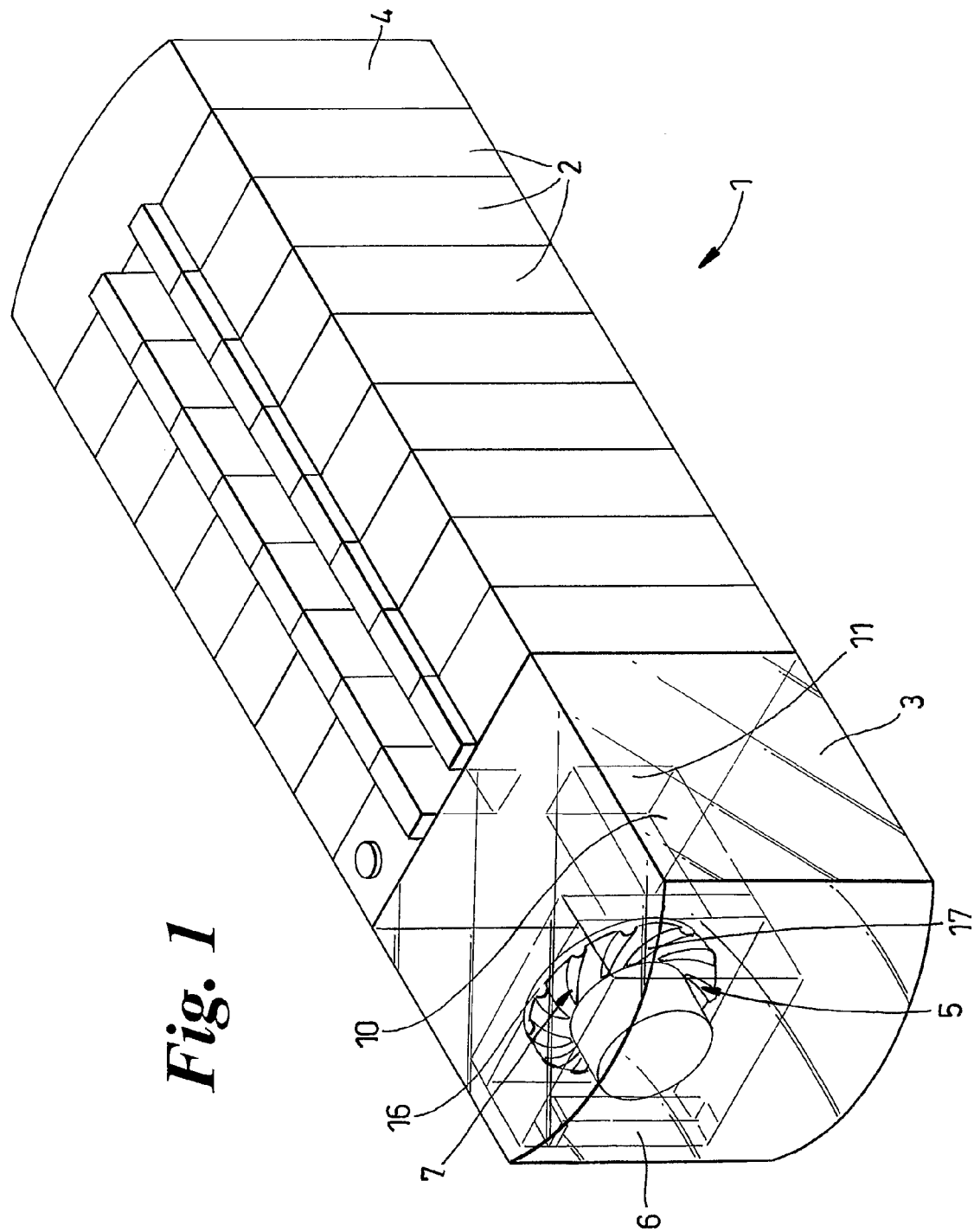
FIG. 1 shows a perspective view of a valve island in accordance with the invention.

FIG. 1 shows a fluid flow control device in the form of a valve island 1. The valve island 1 comprises a series of interconnected valve slices 2 between two end plates 3, 4. Each valve slice 2 houses a valve (not shown) and an electrically-operable actuator (not shown) such as a solenoid. The valves in the valve slices 2 control fluid flow from a pneumatic supply line (not shown). In one of the end plates 3 there is mounted electrical power generation means 5 and an accumulator 6. The power generation means 5 includes a turbine 7 of known design that operates using the fluid flow through the valve island 1. The power generation means 5 is connected to the accumulator 6, which stores the electrical energy generated.

Figure 2:
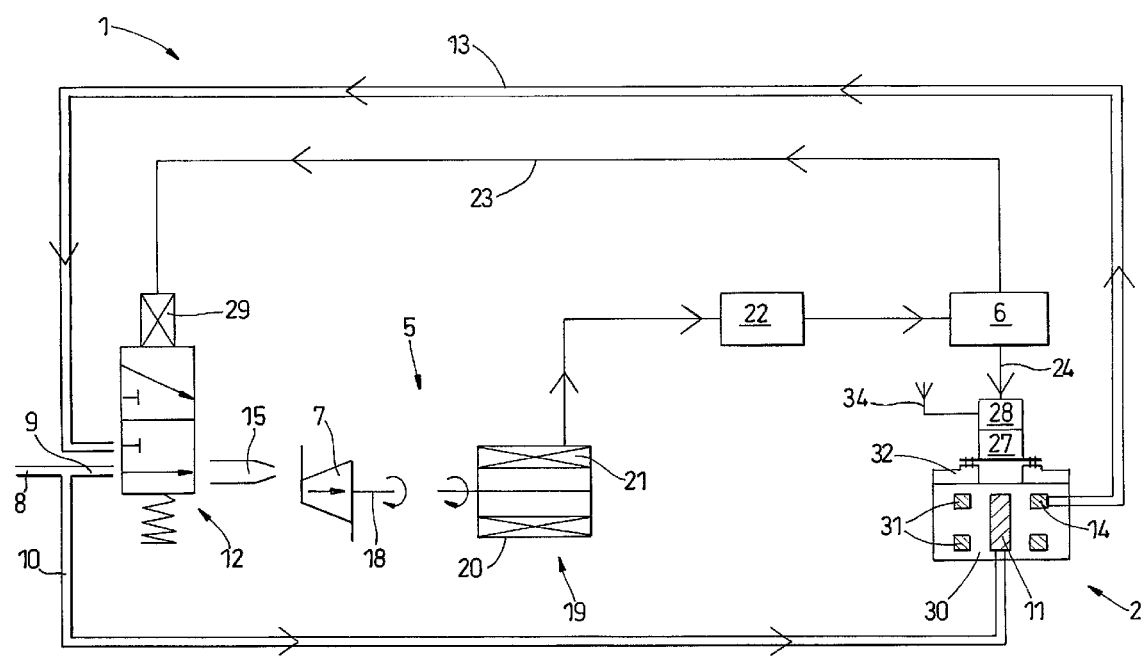
FIG. 2 is a diagram illustrating the valve island shown in FIG. 1.

A diagram of the valve island 1 is shown in FIG. 2, although only one valve slice 2 is shown. A pneumatic supply line 8, which forms part of a supply network, provides the valve island 1 with an external supply of compressed air. The external supply line 8 branches when it enters the valve island 1 to form an input supply line 9 and a valve slice supply line 10. The branch may be biased to ensure that the majority of the air is diverted to the valve slice supply line 10, which is connected to each valve slice 2 in the valve island 1 via a manifold (not shown) that connects to an input port 11. The input supply line 9 is connected to a selection valve 12. An exhaust supply line 13 from exhaust outlets 14 on each valve slice 2 is also connected to the selection valve 12.

The selection valve 12 is a 3 port, 2 position spool valve of known construction that controls the flow path from the supply lines 9, 13 to a nozzle 15. Thus, the selection valve 12 can select the input flow path 9, 13 depending upon the condition and operation of the valve island 1. The selection valve 12 is biased so that by default the turbine 7 is driven by fluid from the input supply line 9. The selection valve 12 is actuated by a solenoid 29.

Fluid leaving the selection valve 12 passes through the nozzle 15, which is designed to direct the fluid flow toward the turbine 7. Further, the diameter of nozzle 15 is calculated to ensure that the volume of air allowed to flow through it, and impinge upon the turbine 7, is sufficient to generate the electricity requirement of the valve island 1. The turbine 7 comprises a circular disc 16 having curved blades 17 that extend radially from its axis, and are raised from the disc 16. A spindle 18 extends longitudinally from the axis of the turbine 7 and forms an armature of an electrical generator 19. The electrical generator 19 is of known construction, with the armature 18 rotating within a cylindrical housing 20 having permanent magnets 21 mounted to its inside surface.

The generator 19 generates an alternating current, which is rectified by a rectifier 22. The accumulator 6 receives the direct current (DC) output from the rectifier 22. The accumulator 6 stores the electricity generated by the generator 19 and may comprise a capacitor or a chargeable battery. There are two output lines 23, 24 from the accumulator. The first output 23 supplies the solenoid 29 of the selection valve 12 with power while the second output 24 supplies power to a control means 27, a communication means 28 and ultimately each valve slice 2.

The communication means 28 includes an antenna 34 that receives signals from a remote management system (not shown) that may wirelessly control many valve islands and other systems on production machinery, for example. The communication means 28 uses any suitable communications standard to communicate with the management system, such as industrial Bluetooth or ZigBee. The communication means receives its electrical power from the accumulator 6 via power line 24.

The control means 27 is connected to the communications means 28 and obtains its electrical power therefrom. The control means 27 comprises a printed circuit board that interprets the control signals received from the communication means 28. The control means 27 then sends the appropriate signals to each solenoid 32 on each valve slice 2 to achieve the desired operation. The control means 27 may span the length of the valve island 1 over the valve slices 2.

The valve slice 2 comprises a body 30 that includes the supply input port 11, the exhaust ports 14, output ports 31 and a solenoid 32. The solenoid 32 receives electrical power from the control means 27 when it is to be actuated and is connected thereto by wires (not shown). The valve slice 2 contains a spool valve, actuated by the solenoid 32, that controls the flow between the input port 11 and the output ports 31.

When installing the valve island 1 the output ports 31 of each valve slice 2 are appropriately connected to the devices (not shown) that the valve island 1 controls. The valve island 1 then only requires the pneumatic supply line 8 to be connected for it to operate. In FIG. 2, the valve island is shown in its start-up state, in the absence of electrical power. The selection valve 12 is in its default position wherein the input supply line 9 is shown in communication with nozzle 15. The flow of air from the input supply line 9 thus initially powers turbine 7. Once the accumulator 6 has been supplied with sufficient power from the generator 19, the solenoid 29 of the selection valve 12 receives the electrical power required to actuate the valve 12. Thus, once the input fluid flow has generated the initial power requirement, the selection valve 12 switches to enable the power generation means 5 to use exhaust air from the valve slices 2 to generate electricity for the valve island 1. This is advantageous, as once the power generation means 5 has generated enough electrical power, the valve island 1 operates without any effect upon the input pneumatic pressure.

Operational instructions for the valve island 1 are received wirelessly through antenna 34 by the communication means 28. The instructions are passed to the control means 27, which interprets the instructions and supplies electrical power to the valve slice solenoids 32 as required to actuate the valves (not shown).

If for instance there is a drop in the flow of exhaust air from the valve slices 2, less air will be available to drive the turbine 7 and thus less electricity will be produced. When the solenoid 29 of the selection valve 12 is not supplied with sufficient electricity the biasing of the valve 12 causes it to switch to its default position wherein the input supply line 9 is in communication with nozzle 15. The air flow from the input supply line 9 then powers turbine 7 to ensure that the communication means 28, control means 27 and valve slice solenoids 32 have an uninterrupted supply of electricity. The valve island 1 continues to be powered from the input supply line 9 until once again sufficient power is generated for the solenoid 29 to switch the selection valve 12 to receive air from the exhaust air line 13.

The biased selection valve 12 also ensures that if the pneumatic air line 8 is shut down or the flow is reduced, the selection valve 12 defaults to a position that allows the valve island to be "restarted" without user intervention.

In a modification (not shown) the selection valve is omitted and the input supply line 9 is permanently connected to the nozzle 15. Thus, the power generation means 5 only uses the flow of air from the input supply line 9. In a further modification (not shown) the input supply line 9 is omitted as well as the selection valve 12. The pneumatic supply line 8 does not branch and is connected directly to the input port 11 via the manifold (not shown). The exhaust air supply line 13 is connected directly to the nozzle 15 so that the exhaust air is used to generate electricity. In this modification an initial power source (not shown) is required to generate the initial power requirements for the communication means 28 and the control means 27, until there is sufficient air flow through the valve slice 2 and out to the exhaust supply line 13. Thus, the initial power source (not shown) only provides the power required for the valve island to start functioning and enable a flow of air through the valve island 1, after which the air flow from the exhaust supply line 13 can be used to power turbine 7 and generate electricity. The initial power source may be a compressed fluid vessel that is adapted to exhaust through the turbine 7 thus generating electricity. The valve island 1 may have means for recharging the compressed fluid vessel with the compressed air from the pneumatic supply line 8. Alternatively, the initial power source may be, for example, a battery that powers the control means 27 and communication means 28 directly, until the flow of air through the exhaust supply line 13 is sufficient to generate the power requirement of the valve island 1. The battery may be rechargeable and thus may receive an output from the accumulator 6, which is used to recharge the battery once the power generation means 5 is generating electricity from the exhaust air.

The invention claimed is:

1. A fluid flow control device comprising at least one valve, the at least one valve including an input port (11), an outlet port (31), and an exhaust outlet (14), the at least one valve being controlled by an electrically-operable actuator (32), a control means (27) for controlling one or more of the actuators (32) and a communication means (28) to provide signals for the control means, wherein the device includes an electrical power generation means (5) to generate electricity from the flow of fluid in the control device (1) to operate one or more of the actuators (32), the control means (27) and the communication means (28), wherein a fluid flow from the exhaust outlet (14) of the at least one valve acts on the electrical power generation means (5) to generate electricity.

2. The fluid flow control device according to claim 1, in which the device (1) receives fluid from a fluid flow supply line (8).

3. The fluid flow control device according to claim 1, in which the communication means (28) operates wirelessly.

4. The fluid flow control device according to claim 1, in which the fluid flow supply line (8) is a pneumatic line.

5. The fluid flow control device according to claim 1, in which the fluid flow supply line (8) is a hydraulic line.

6. The fluid flow control device according to claim 3, in which the communication means (28) operates using radio frequency wireless communication.

7. The fluid flow control device according to claim 3, in which the communication means (28) operates wirelessly using the Bluetooth standard.

8. The fluid flow control device according to claim 3, in which the communication means (28) operates wirelessly using the ZigBee standard.

9. The fluid flow control device according to claim 3, in which the communication means (28) operates wirelessly using the Wi-Fi standard.

10. The fluid flow control device according to claim 1, in which the electrical power generation means (5) uses the fluid flow from the fluid flow supply line (8) to generate electricity.

11. The fluid flow control device according to claim 1, in which the control means (27) includes an initial power source that provides the power to operate one or more of the actuators (32), the control means (27) and the communication means (28) until the flow of fluid from the exhaust (14) of the valve or valves is sufficient to cause the power generation means (5) to generate electricity.

12. The fluid flow control device according to claim 11, in which the initial power source is a pre-charged battery.

13. The fluid flow control device according to claim 11, in which the initial power source is a vessel of compressed fluid that is adapted to be exhausted through the power generation means (5) to generate electricity initially.

14. The fluid flow control device according to claim 11, in which the initial power source is rechargeable.

15. The fluid flow control device according to claim 1, in which the device includes a selection valve (12) that has two inputs (9, 13) and one output (15) to the power generation means (5), the first input (9) receives fluid flow from the fluid flow supply line (8) and the second input (13) receives fluid from the exhaust (14) of the at least one valve, the selection valve (12) being adapted to select which of the inputs (9, 13) is in communication with the power generation means (5).

16. The fluid flow control device according to claim 15, in which the selection valve (12) is actuated by a solenoid (29).

17. The fluid flow control device according to claim 16, in which the selection valve (12) is controlled electronically to select which fluid flow is used to generate electricity in the device (1).

18. The fluid flow control device according to claim 15, in which the selection valve (12) is biased so that by default the fluid flow supply line (8) is in communication with the power generation means (5).

19. The fluid flow control device according to claim 16, in which the solenoid (29) of the selection valve (12) is supplied with power from the power generation means (5).

20. The fluid flow control device according to claim 1, in which the power generation means (5) comprises a turbine (7) that is connected to an electrical generator (19).

21. The fluid flow control device according to claim 1, in which the power generation means (5) is connected to an accumulator (6) such that the accumulator (6) stores the electrical power generated by the power generation means (5).

22. The fluid flow control device according to claim 21, in which the accumulator (6) is a capacitor.

23. The fluid flow control device according to claim 21, in which the accumulator (6) is a rechargeable battery.

24. The fluid flow control device according to claim 21, in which a rectifier (22) rectifies the electrical output from the power generation means (5) before it enters the accumulator (6).

25. The fluid flow control device according to claim 1, in which the device (1) controls the flow of water.

26. The fluid flow control device according to claim 1, in which the device (1) controls the flow of a gas.

* * * * *